United States Patent [19]

Shalvi

[11] Patent Number: 5,467,257
[45] Date of Patent: Nov. 14, 1995

[54] SOLAR PANEL UNIT AND SOLAR LAMP INCLUDING SAME

[75] Inventor: Ram Shalvi, Hong Kong, Hong Kong

[73] Assignee: Solar Wide Industrial Ltd., Hong Kong

[21] Appl. No.: 232,225

[22] PCT Filed: Nov. 4, 1992

[86] PCT No.: PCT/GB92/02038

§ 371 Date: May 4, 1994

§ 102(e) Date: May 4, 1994

[87] PCT Pub. No.: WO93/09378

PCT Pub. Date: May 13, 1993

[30] Foreign Application Priority Data

Nov. 4, 1991 [GB] United Kingdom ............... 9123342

[51] Int. Cl.[6] .................... F21L 13/00; H01L 31/042
[52] U.S. Cl. ................... 362/183; 136/246; 136/291; 250/203.4; 353/3
[58] Field of Search ............................ 136/246, 291; 362/183; 250/203.4; 353/3; 126/576, 605

[56] References Cited

U.S. PATENT DOCUMENTS 4,977,488 12/1990 Spotts et al. .................. 362/183
5,055,984 10/1991 Hung et al. .................... 362/183

FOREIGN PATENT DOCUMENTS

| 0079267 | 5/1983 | European Pat. Off. | 362/183 |
| 3047724 | 7/1982 | Germany | 136/246 |
| 9006449 | 9/1990 | Germany | 136/246 |
| 56-23786 | 3/1981 | Japan | 136/246 |
| 60-42555 | 3/1985 | Japan | 126/600 |
| 62-236009 | 10/1987 | Japan | 136/246 |

*Primary Examiner*—Aaron Weisstuch
*Attorney, Agent, or Firm*—Ostrolenk, Faber, Gerb & Soffen

[57] ABSTRACT

A solar panel unit includes a solar panel (10) supported for rotation about a frame (13) and driven around the frame (13) by an electric motor (14). Radiation sensors (22) and (23) have their planar axes equally and oppositely off-set from the planar axis of the panel (10). Signals from the sensors (22) and (23) are monitored and used to control the operation of the motor (14) such that the panel (10) moves as the sun moves during daylight hours and the panel remains with its planar axis at right angles to rays of the sun throughout the day.

7 Claims, 2 Drawing Sheets

5,467,257

SOLAR PANEL UNIT AND SOLAR LAMP INCLUDING SAME

FIELD OF THE INVENTION

The invention relates to solar lamps.

The invention relates more particularly to a solar panel unit for a solar lamp.

BACKGROUND OF THE INVENTION

Normally, the solar panel converts solar energy during the day time into electrical power to charge up or to maintain a charge in a battery power pack which supplies the lamp during the night as required.

Customarily, the panel is oriented to be directly facing the sun, that is, with its planar surface at least approximately perpendicular to the direction of the sun at noon each day. The conversion of solar energy by a solar panel is most efficient in this position but as the sun moves throughout the daylight hours, the panel is for most of the day operating at considerably less than its optimum efficiency.

OBJECT AND SUMMARY OF THE INVENTION

It is an object of the invention to overcome or at least reduce this problem.

According to the invention there is provided a solar panel unit comprising a movable solar panel arrangement support carriage and a drive motor for moving the carriage to orient the panel arrangement relative to the sunlight into optimum orientations for receiving solar energy, in which the panel arrangement comprises two panels to convert solar energy into electrical power to charge up or to maintain a charge in a battery power pack, in which the two panels are somewhat angularly off-set from one another and from a central mean optimum orientation of the panel arrangement, including means for sensing the intensity of solar energy converted by each panel and controlling operation of the motor whenever the two converted energies are significantly unequal to move the panel arrangement towards optimum orientations as the sun moves relative to the unit.

The carriage may be pivotably supported about an axis and the motor arranged to move the carriage about the axis, which axis in use is positioned generally perpendicular to the radius of the arc of daily movements of the sun.

BRIEF DESCRIPTION OF THE DRAWINGS

A solar panel unit according to the invention will now be described by way of example with reference to the accompanying drawings in which.

DESCRIPTION OF THE INVENTION

Figure 1:
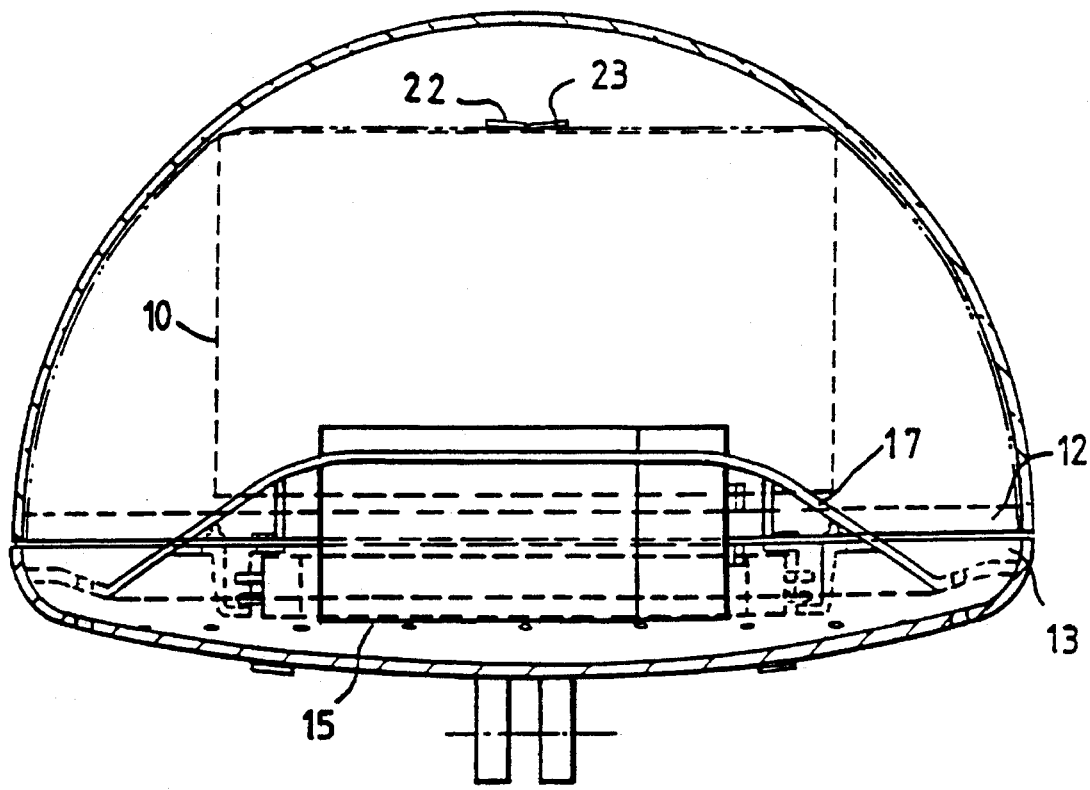
FIG. 1 shows a sectional front view of the unit.
Figure 2:
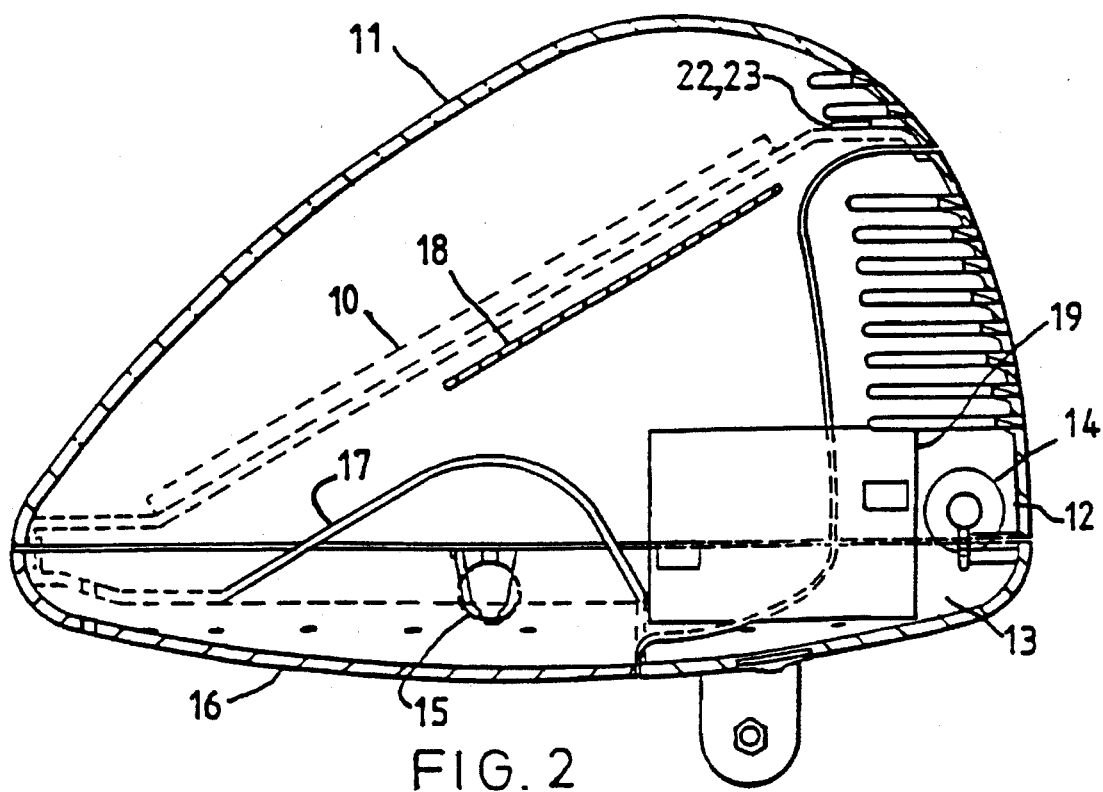
FIG. 2 is a sectional side view of the unit.

Referring to the drawings, in FIGS. 1 and 2 the unit includes a main solar panel 10 formed by an array of solar cells in conventional fashion mounted behind a window 11 to receive solar energy. The panel 10 is mounted on a carriage 12 which is rotatably supported on a frame 13 to turn about the frame. The panel 10 is supported in use with its window 11 facing the sun. When the front plane of the window 11 is generally perpendicular to the rays of the sun, the main panel 10 is in its optimum orientation for receiving solar energy. A motor 14 is provided for moving the carriage in either direction around the frame 13.

A fluorescent lamp 15 is supported in the frame 13 behind a transparent lamp cover 16 and in front of a reflector 17. Two auxiliary solar cell panels 20 and 21 with respective windows 22 and 23 are mounted at the top of the panel 10 (see FIG. 2) and a printed circuit board 18 is mounted under the panel 10. A battery pack 19 for storing electrical energy generated by main panel 10 is mounted on the frame 13.

Figure 3:
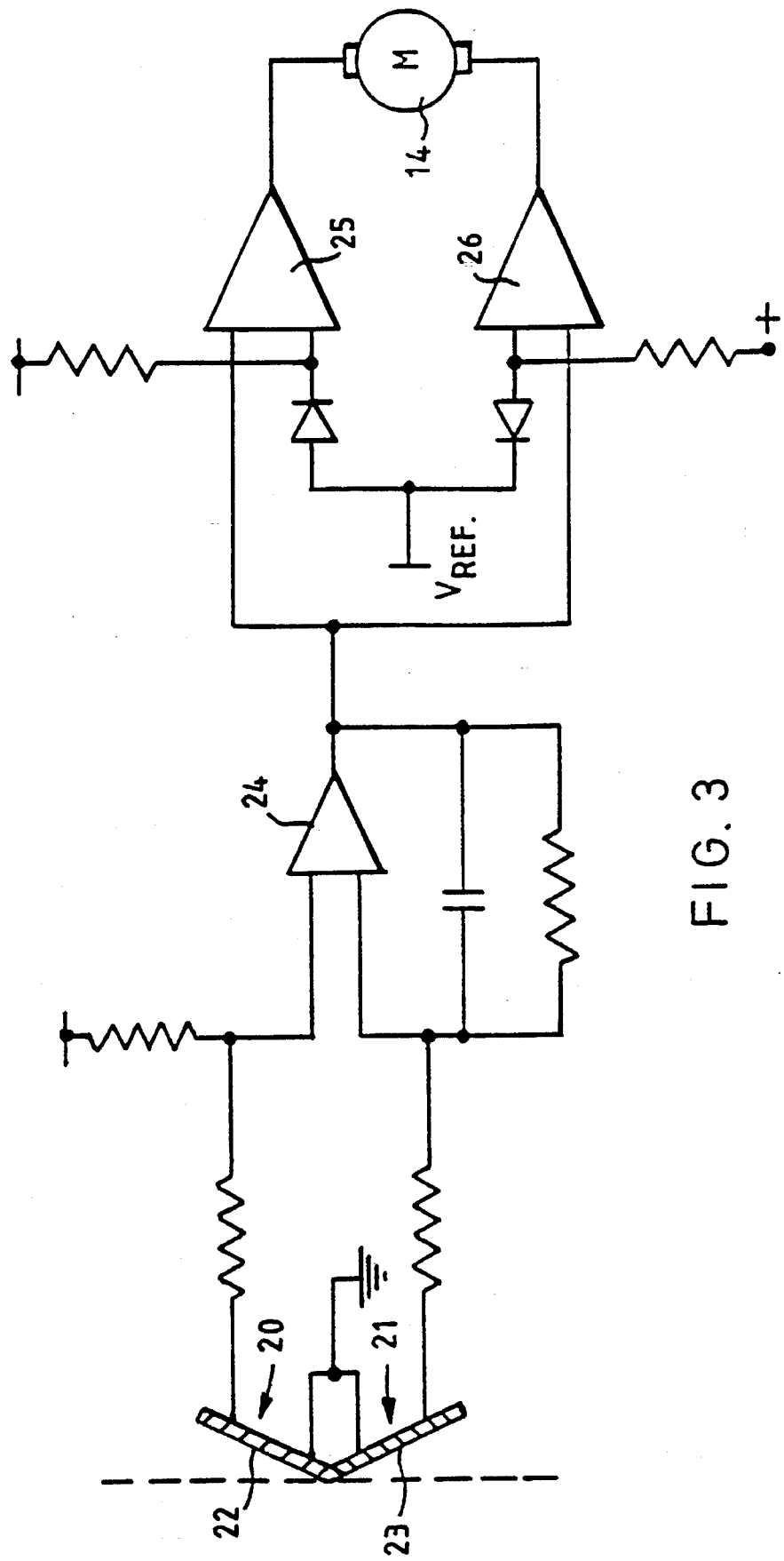
FIG. 3 shows an electrical circuit arrangement for the unit.

Referring to FIG. 3, the two small auxiliary solar cell panels 20 and 21 are mounted on the carriage with their windows 22 and 23 equally off-set from the plane of the surface of the window of the main solar panel. The panels 20 and 21 are electrically connected to a comparator 24 which responds to differences in the currents generated by the solar cell panels 20, 21 when they convert solar energy. When the difference in currents exceeds a value corresponding to a voltage D/2 as compared to a reference voltage, the output of the comparator 24 is fed to bias parallel coupled amplifiers 25 and 26, also supplied with the reference voltage. This causes a supply current to flow in a drive motor 14 in one direction or an opposite direction according to the polarity of the bias applied to the amplifiers.

The drive motor 14 will run forwards or backwards according to the direction of the supply current until the bias returns to equal the reference voltage as the carriage is moved by the motor. This is when the auxiliary panels 20 and 21, turning together with the main panel 10, have moved until they receive substantial the same amount of solar energy.

The circuit is arranged so that the motor is only energised when the solar energy converted by the auxiliary solar cell panels 20 and 21 is significantly unequal. In this way the motor is only energised say every five minutes. Alternatively, or additionally, a timer circuit may be provided to constrain, or prevent, the motor being energised in intervals of less than five minutes. This has the effect of conserving the electrical energy required to move the main solar panel and reduces the overall efficiency of the solar energy conversion only marginally in practice.

In other embodiments of the invention, the solar panel is formed with two arrays of cells in two main panels which are angularly off-set, say 1° or 2°, to one another and at either side of a mean optimum orientation. In other words, the two main panels are positioned side by side facing the direction of the sun and, in the mean optimum orientation, each main panel is off-set from its own optimum orientation by, say, ½° or 1° respectively. The output of each panel, that is the solar energy converted to electrical power, is sensed and used to provide a control signal to initiate and control the operation of the drive motor. The small reduction in efficiency caused by off-setting the main solar panels is compensated for in practice by there being no need to provide the auxiliary solar panels 20 and 21, or other radiation sensors.

The unit may be arranged to be generally stationary except during the hours of say 9 a.m. to 3 p.m. Generally, movement of panels to follow the movement of the sun during a central part of each day is sufficient to significantly increase the overall conversion of solar energy, as compared to using normal permanently fixed or stationary panels. Thus the motor is inhibited so as not to be operative before, say, 9 a.m. and after 3 p.m. The circuit is provided with a time-of-day clock to provide suitable control signals for the motor and to cause the motor to move the carriage from a 3 p.m. position to a 9 a.m. position during the night.

The clock may be provided with and selectable different settings as may be required for generally different conditions applicable between seasonal variations of the relative movement of the sun.

I claim:

1. A solar panel unit comprising a movable solar panel arrangement support carriage and a drive motor for moving the carriage to orient the panel arrangement relative to the sunlight into optimum orientations for receiving solar energy, in which the panel arrangement comprises first and second main panels to convert solar energy into electrical power to charge a battery power pack, characterised in that the first and second main panels are angularly off-set slightly from one another and from a central mean optimum orientation of the panel arrangement, including means for sensing the intensity of solar energy being converted by the first and second main panels into respective first and second converted energies and controlling operation of the motor when there is an increasing energy difference between the first and second converted energies which exceeds a predetermined level of magnitude sufficient to move the panel arrangement towards optimum orientations as the sun moves relative to the unit.

2. A unit according to claim 1, characterised in that the carriage is pivotably supported about an axis and the motor is arranged to move the carriage about the axis, which axis in use is positioned generally perpendicular to the radius of the arc of daily movements of the sun.

3. A unit according to claim 2, characterized by means to constrain the motor to move the carriage intermittently at intervals of a few minutes or more.

4. A solar lamp having a housing characterized by a solar panel unit according to claim 2.

5. A unit according to claim 1, characterised by means to constrain the motor to move the carriage intermittently at intervals of a few minutes or more.

6. A solar lamp having a housing characterized by a solar panel unit according to claim 5.

7. A solar lamp having a housing characterized by a solar panel unit according to claim 1.

* * * * *